(12) United States Patent
Guyot

(10) Patent No.: US 8,271,801 B2
(45) Date of Patent: Sep. 18, 2012

(54) IMPLEMENTING DATA CONFIDENTIALITY AND INTEGRITY OF SHINGLED WRITTEN DATA

(75) Inventor: Cyril Guyot, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 519 days.

(21) Appl. No.: 12/622,400

(22) Filed: Nov. 19, 2009

(65) Prior Publication Data

US 2011/0119498 A1 May 19, 2011

(51) Int. Cl.
*G06F 11/30* (2006.01)
*G06F 12/14* (2006.01)

(52) U.S. Cl. ........ 713/189; 713/175; 713/178; 713/193; 726/16; 726/27; 380/37; 380/201; 380/278; 380/269; 711/103; 711/115; 711/202; 711/206; 369/52.1; 369/93

(58) Field of Classification Search .................... 713/189
See application file for complete search history.

(56) References Cited

U.S. PATENT DOCUMENTS

| 6,185,063 | B1 | 2/2001 | Cameron | |
|---|---|---|---|---|
| 6,967,810 | B2 | 11/2005 | Kasiraj et al. | |
| 2003/0065925 | A1* | 4/2003 | Shindo et al. | 713/178 |
| 2005/0251866 | A1* | 11/2005 | Kobayashi et al. | 726/27 |
| 2012/0110343 | A1* | 5/2012 | Bandic et al. | 713/189 |

OTHER PUBLICATIONS

U.S. Appl. No. 12/402,415 entitled Techniques for Storing Shingle Blocks in a Cache Memory Using a Data Storage Device, filed Mar. 11, 2009.

* cited by examiner

*Primary Examiner* — Nathan Flynn
*Assistant Examiner* — Bryan Wright
(74) *Attorney, Agent, or Firm* — Joan Pennington

(57) ABSTRACT

A method, apparatus and a data storage device are provided for implementing data confidentiality and integrity of data stored in overlapping, shingled data tracks on a recordable surface of a storage device. A unique write counter is stored for each zone written to the recordable surface of the storage device. An encryption key is used together with the write counter information and a logical block address to encrypt each sector being written, and to decrypt all sectors being read. An individual sector is decrypted, obtaining the write counter information and reading the data sector. A message authentication code is stored for each zone. All sectors of the zone are read to perform integrity check on a sector.

20 Claims, 6 Drawing Sheets

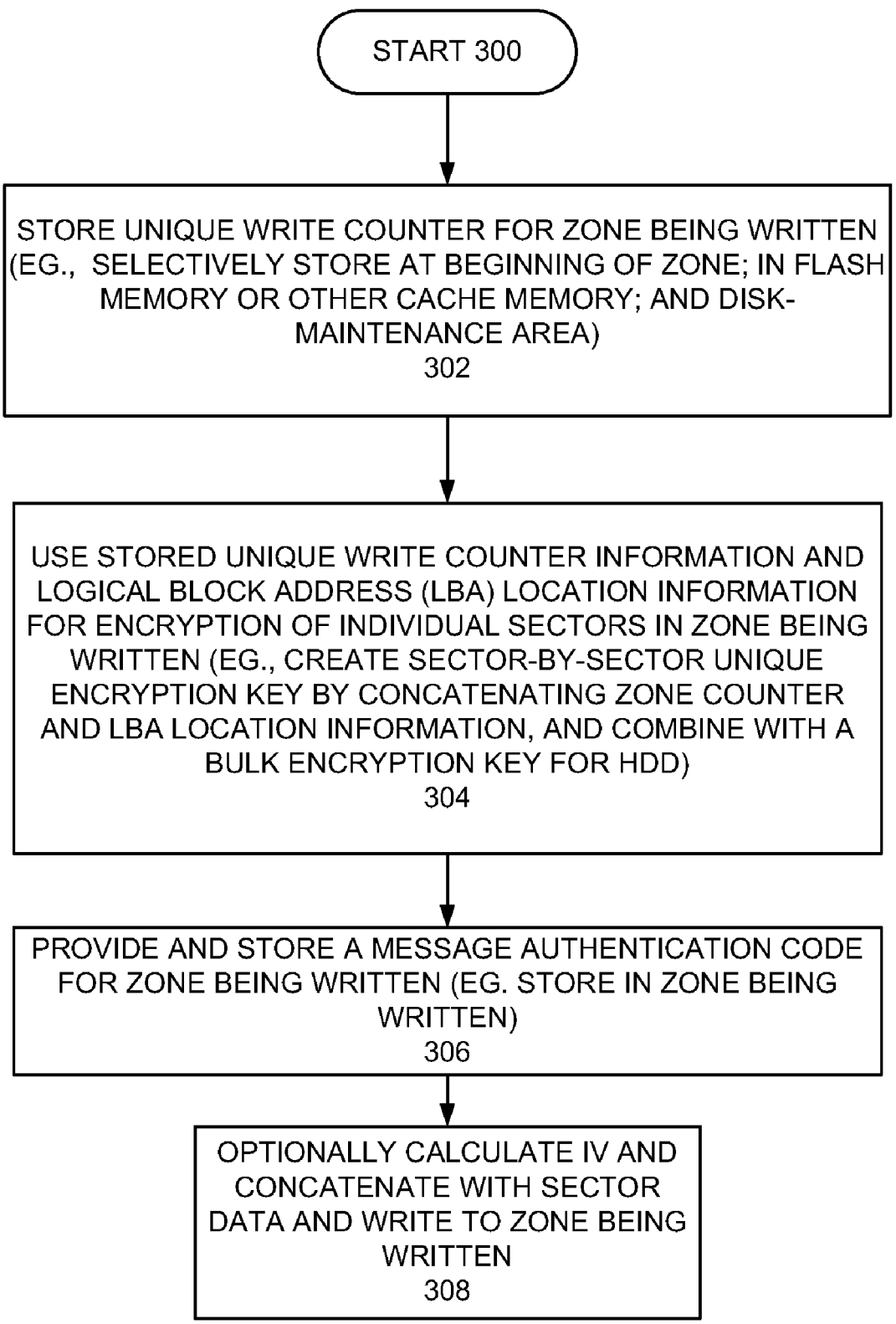

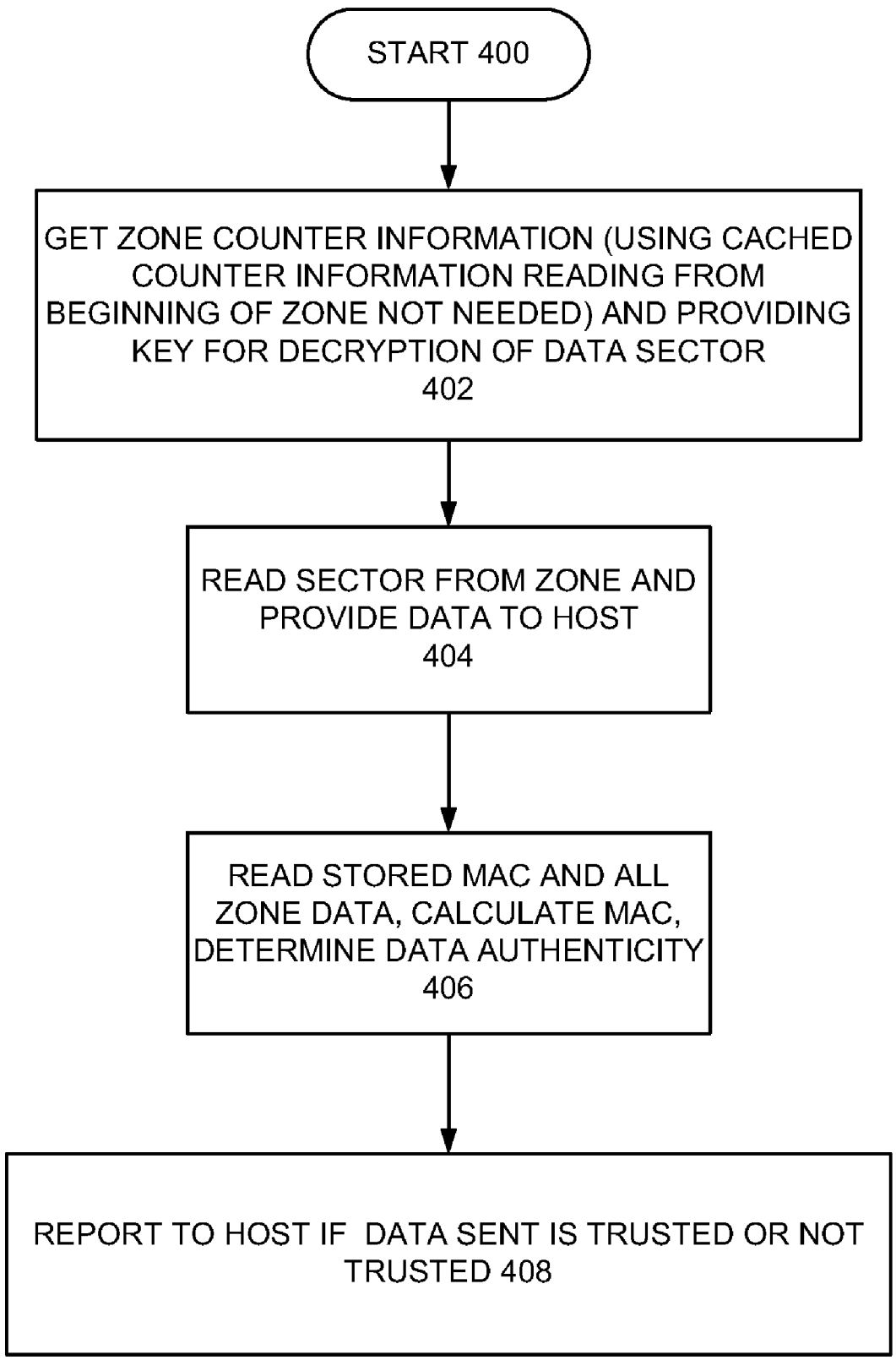

//IMPLEMENTING DATA CONFIDENTIALITY AND INTEGRITY OF SHINGLED WRITTEN DATA

FIELD OF THE INVENTION

The present invention relates generally to the data storage field, and more particularly, relates to a method, apparatus and a data storage device for implementing data confidentiality and integrity of stored shingled written data in overlapping data tracks on a recordable surface of a storage device.

DESCRIPTION OF THE RELATED ART

Examples of hard disk drives (HDDs) with shingled writing or data written in overlapping data tracks are described in U.S. Pat. No. 6,967,810, to Kasiraj et al., and in U.S. Pat. No. 6,185,063, to Cameron.

U.S. patent application Ser. No. 12/402,415 entitled Techniques For Storing Shingle Blocks in a Cache Memory Using a Data Storage Device, filed Mar. 11, 2009, and assigned to the present assignee, discloses a data storage apparatus including a data storage medium, a write element, a non-volatile cache memory circuit, and a controller circuit. The controller circuit is configured to record data on the data storage medium in groups of overlapping tracks using the write element. The controller circuit is configured to store a shingle block of data from a subset of the overlapping tracks in the non-volatile cache memory circuit, while at least a portion of the data in the shingle block of data is updated.

SUMMARY OF EMBODIMENTS OF THE INVENTION

Aspects of the present invention are to provide a method, apparatus and a data storage device for implementing data confidentiality of data written in overlapping, shingled data tracks on a recordable surface of a storage device. Other important aspects of the present invention are to provide such method, apparatus and data storage device substantially without negative effect and to overcome some of the disadvantages of prior art arrangements.

In brief, a method, apparatus and a data storage device are provided for implementing data confidentiality and integrity of data stored in groups of overlapping, shingled data tracks on a recordable surface of a storage device. A unique write counter is stored for each group of tracks or zone written to the recordable surface of the storage device. An encryption key is used together with the write counter information and a logical block address to encrypt each sector being written, and to decrypt each sector being read.

BRIEF DESCRIPTION OF THE DRAWINGS

The present invention together with the above aspects, features, and advantages may best be understood from the following detailed description of the embodiments of the invention illustrated in the drawings, wherein:

FIGS. 3, and 4 are flow charts illustrating example operations of the system of FIG. 1 in accordance with embodiments of the invention.

DETAILED DESCRIPTION OF THE EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

In accordance with features of the embodiments of the invention, methods are provided for efficiently providing confidentiality and integrity of stored data written in overlapping, shingled data tracks on a recordable surface of a storage device, such as a hard disk drive. With some shingle-written storage devices, writes are performed on one zone at a time and reads are done on individual sectors. Zones are made up of many individual data sectors, typically including a number of tracks containing multiple individual sectors.

In accordance with features of the embodiments of the invention, encryption typically is done sector-by-sector, while authentication is done once for a zone. This means that only one sector needs to be read to decrypt that sector, the need for reading the entire zone is eliminated. A message authentication code is calculated on all sectors of the zone and stored with the zone. To validate the authenticity of the message authentication code, all sectors of the zone are read to perform the integrity check on the full zone, and therefore on each individual sector making up the zone.

Figure 1:
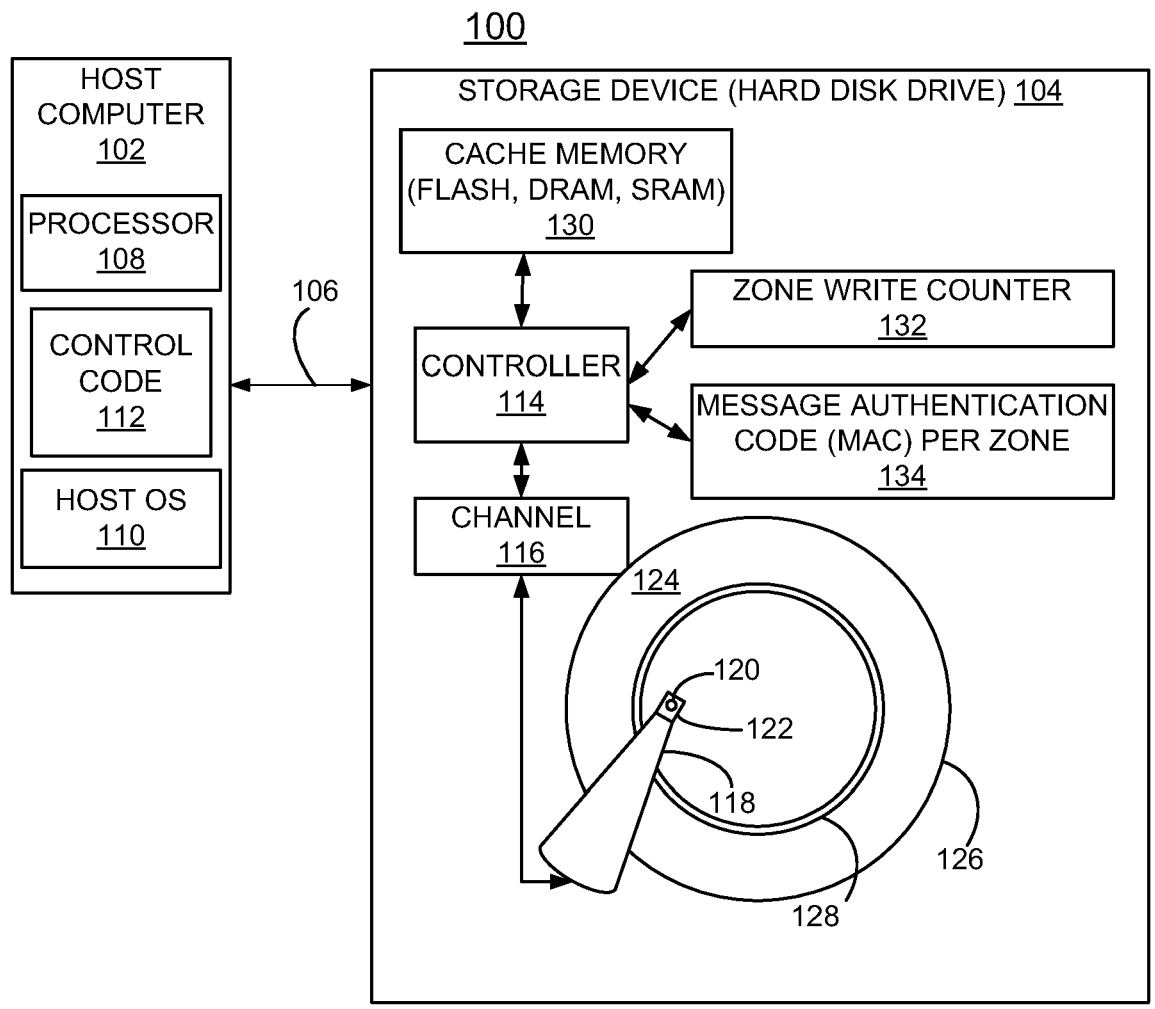
FIG. 1 is a block diagram representation illustrating a system for implementing data confidentiality and integrity methods in accordance with an embodiment of the invention.

Having reference now to the drawings, in FIG. 1, there is shown an example system generally designated by the reference character 100 for implementing data confidentiality and integrity of stored data written in overlapping data tracks on a recordable surface of a storage device in accordance with an embodiment. System 100 includes a host computer 102, a storage device 104, such as a hard disk drive 104, and an interface 106 between the host computer 102 and the storage device 104.

As shown in FIG. 1, host computer 102 includes a processor 108, a host operating system 110, and control code 112. The storage device or hard disk drive 104 includes a controller 114 coupled to a data channel 116. The storage device or hard disk drive 104 includes an arm 118 carrying a read/write head including a read element 120, and a write element 122.

In operation, host operating system 110 in host computer 102 sends commands to hard disk drive 104. In response to the commands, hard disk drive 104 performs requested functions such as reading data, writing data, erasing data, and the like, on disk surface 124. The write element 122 writes magnetic patterns of data on a recordable or writable surface 124 of a disk 126. According to some embodiments of the present invention, controller circuit 114 causes write element 122 to record magnetic patterns of data on a writable surface of disk 122 in overlapping circular tracks 128 using shingled writing.

Although the example embodiment of system 100 is described in the context of the hard disk drive 104, it should be understood that principles of the present invention advantageously are applied to other types of data storage devices.

Figure 2A:
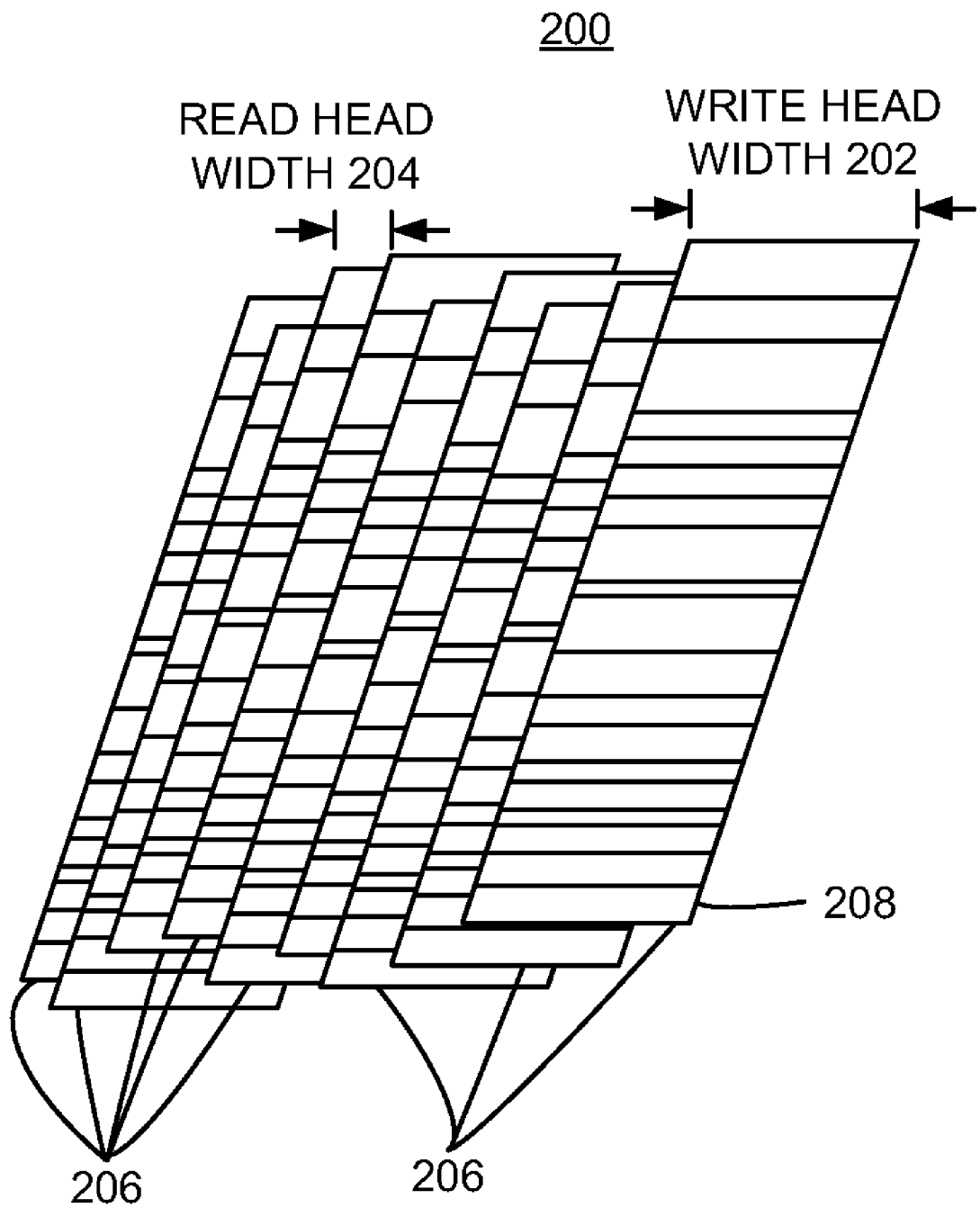
FIGS. 2A and 2B schematically illustrate not to scale an example block of shingled writing in a storage device of the system of FIG. 1 in accordance with an embodiment of the invention.
Figure 2B:
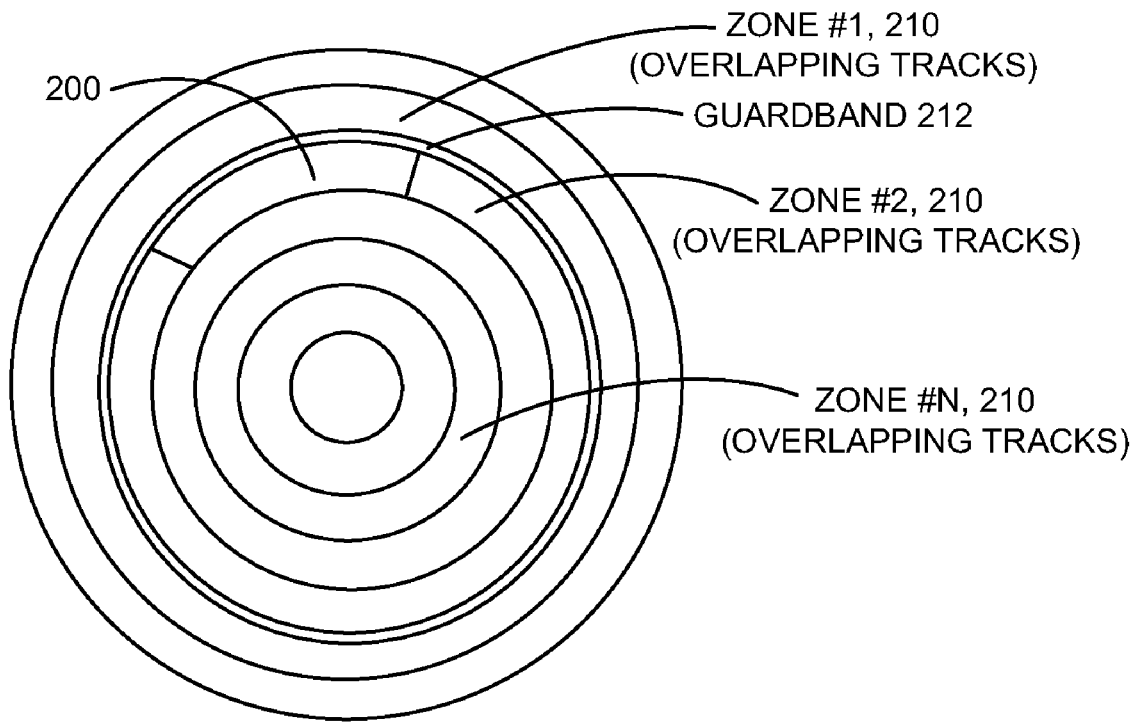

In accordance with embodiments of the invention, system 100 includes a cache memory 130, for example, implemented with one or a combination of a flash memory, a dynamic random access memory (DRAM) and a static random access memory (SRAM). A zone write counter 132, stored on the drive media, is used to assist encryption of individual sectors and, separately, to assist integrity check of an entire zone 210, as illustrated in FIGS. 2A, and 2B. A message authentication code (MAC) 134, stored on the drive media, is used to verify integrity or authenticate a message is stored for each zone 210. When the integrity of the data stored in the zone needs to be ascertained, all sectors of the zone are read to perform an integrity check on sectors within the zone.

Controller 114 can include various implementations, for example, fabricated with one or multiple integrated circuit dies. A digital video recorder (DVR), a set-top-box (STB), or various other computer system types are specific implementation of a host computer 102. While the control code 112 is shown in the host computer 102, and the controller 114 is shown in the hard disk drive 104, the control code 112 may reside in any suitable location, such as the hard disk drive 104 separate from host computer 102 and controller circuit 114 may reside in any suitable location, separate from hard disk drive 104, for example, in the host computer 102, and the like.

System 100 including the host computer 102 and the storage device or hard disk drive 104 is shown in simplified form sufficient for understanding the present invention. The illustrated host computer 102 together with the storage device or hard disk drive 104 is not intended to imply architectural or functional limitations. The present invention can be used with various hardware implementations and systems and various other internal hardware devices.

With shingled writing, zones including tracks 128 of the hard disk drive 104 are written in sequence and overlayed, such as roof shingles, such as zones 210 illustrated in FIGS. 2A, and 2B, to write data onto magnetically writable surfaces. Adjacent tracks that are written onto a magnetic hard disk using shingled writing principles overlap each other on the writable surface 124 of the hard disk 126. By overlapping tracks of data, typically much higher track density can be achieved. However, a track of data stored on the writable surface of a magnetic hard disk using shingled writing principles cannot be overwritten without erasing data stored on other tracks that the track to be written overlays.

FIGS. 2A and 2B schematically illustrate not to scale an example block 200 of shingled writing in a storage device, or hard disk drive 104 of the system 100 in accordance with an embodiment of the invention.

As shown in FIG. 2A, the write head width 202 is much wider, for example, approximately three times wider, than the width of final data tracks, and the read head width 204 is sufficiently narrow so as to read back data from only one trimmed track at a time. The data block 200 includes a plurality of overlapping data tracks 206. Each of the tracks 206 contains several sectors. Each sector contains several bytes of data. An example of a sector 208 is shown. The data block 200 includes a plurality of or a set of overlapping sectors 208, such as one or more sectors in length.

FIG. 2B illustrates not to scale a plurality of zones #1-#N, 210, with a guardband 212 shown between the zones #1-#2, 210. Each of the plurality of zones #1-#N, 210 includes a plurality of overlapping tracks, not separately shown in FIG. 2B. The particular number of the plurality of tracks included in the zones 210 is related to the width of the write head 122. The guardband 212 illustrated between the plurality of zones #1-#N, 210 is provided so that writing to a last track in a zone 210 does not interfere with writing to a next zone.

For shingled written drives of the embodiments of the invention, writes are performed on sectors within a respective zone 210, typically each zone 210 includes a number of tracks containing many individual sectors 208. For shingled written drives, the reads are performed on single sectors. In contrast, for non-shingled drives, read and writes are done on individual sectors.

For non-shingled drives, data integrity information typically is tied to the single sector. Data integrity bytes expand the total number of bytes written to the disk, increasing overhead, and decreasing format efficiency of the hard disk drive. For example, with a 512-byte sector, a 16-byte block cipher is about 3% of the written data. In order to reduce the overhead, larger blocks can be used to calculate the integrity, but read and write operations on smaller blocks would then suffer.

In embodiments of the invention, a message authentication code (MAC) is used for data integrity. A message authentication code (MAC) can be created using a key and the actual user data. In some embodiments of the invention, an initialization vector (IV) is used for known encryption modes. The initialization vector (IV) has an overhead, typically 16 bytes per 512-byte sector, or an additional 3% of overhead.

Referring now to FIGS. 3, and 4, there are shown flow charts illustrating example operations of the system 100 of FIG. 1 in accordance with embodiments of the invention.

In FIG. 3, example operations, for example, performed by controller 114, start as indicated at a block 300. A unique write counter is stored for a zone 210 being written as indicated at a block 302. For example, the write counter information is stored at one or more of a beginning of the zone 210 being written; in a flash memory or other cache memory; and a disk-maintenance area of the disk for the zone 210 being written, as shown at block 302.

In some embodiments of the invention, with the write counter information stored in the flash memory 130 or other cache memory, only a respective sector for a host request is read to decrypt the sector. In some embodiments of the invention, counter information stored at the beginning of the zone 210 may be used to decrypt the sector.

As indicated at a block 304, the stored unique write counter information is used together with the logical block address (LBA) of the sector for encryption of individual sectors in the zone being written. For example, a sector-by-sector encryption counter is created by concatenating the write counter information with the N-bit location of the LBA within the zone. Each counter is then used to encrypt its associated sector in the zone. For example, the encrypted sector $C\_i$ of a plaintext sector $P\_i$ is represented by:

$$C\_i = E(\text{counter}\_i) \wedge P\_i$$

where $E(\text{counter}\_i)$ represents the encrypted write counter information, and ^ represents the exclusive-OR operation. The encryption transformation for each sector optionally is created by a bulk encryption key for the storage device 104 and the combined write counter information, and the LBA location information for the sector within the zone, as shown in block 304.

A message authentication code (MAC) is provided and stored for each zone 210, is as indicated at a block 306. For example, the MAC is stored in the zone being written. In embodiments of the invention, all sectors of the zone are read to perform integrity check on a sector. The single integrity MAC per zone reduces storage overhead, while still allowing authentication of all the sectors of the zone.

In non-shingled drives data integrity information, when present, typically is tied to the single sector, otherwise performance suffers. The associated storage overhead is usually too large to be practical for many storage devices. Therefore an attractive alternative is to use non-expanding encryption modes which provide only a reduced form of integrity: the pseudo-integrity. Examples of such cryptographic transforms are Tweakable Pseudo Random permutations, like the AES-XTS mode. The present invention provides a way of achieving full integrity, not just pseudo-integrity, on shingle-written storage devices at the cost of only a minor storage overhead.

The MAC stored at block 306 can be calculated as the data is encrypted. The MAC can be verified as data is decrypted, for example, for Galois Counter Mode (GCM), which is an authenticated encryption algorithm designed to provide both authentication and privacy, for symmetric key cryptographic block ciphers. The MAC checking to verify data being decrypted optionally is decoupled from data reads with random reads of single data sectors when integrity check is not required for that single data sector read. As shown in FIG. 4, with MAC checking decoupled from data reads, less processing is required and faster random reads are enabled.

In some embodiments of the invention, optionally an initialization vector (IV) is calculated and combined with sector data and written to the zone being written as indicated at a block 308. The IV has an overhead, typically 16 bytes per 512-byte sector, or an additional 3% of overhead.

In FIG. 4, example read operations, for example, performed by controller 114, start as indicated at a block 400. Zone counter information is identified, for example, cached zone counter information is obtained so that reading information from the beginning of the zone is not required as indicated at a block 402. Using the cached zone counter information provides improved performance because the need to read the zone counter information from the disk is eliminated when sectors are read.

Individual sectors are read one at a time, and MAC checking is postponed. Sector data is read from the zone and provided to the host computer 102 as indicated at a block 404. After the whole data zone is read, the MAC is validated to determine authenticity of the data as indicated at a block 406. Using the single integrity MAC for each zone reduces the storage overhead, with authenticating integrity of data of entire zone being enabled using the single MAC for all the zone's sectors. In response to the determination of data authenticity at block 406, notice is provided to the host computer 102 reporting if the data sent is trusted or not trusted as indicated at a block 408.

It should be understood that various known integrity checking techniques can be used with the embodiments of the invention; for example, Wegman Carter mode, such as UMAC, HMAC, GMAC, Cipher block chaining MAC (CBC-MAC) and other encryption modes known to those skilled in the art.

Figure 5:
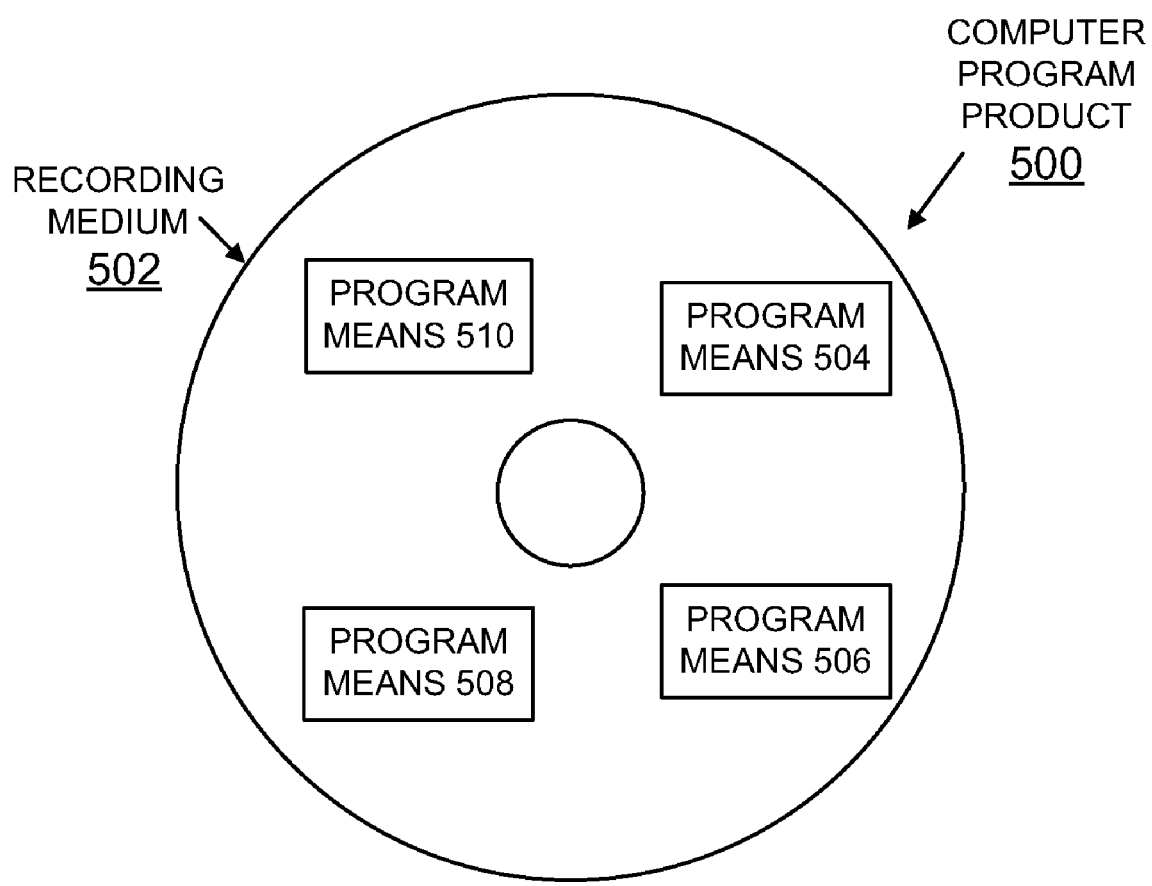
FIG. 5 is a block diagram illustrating a computer program product in accordance with embodiments of the invention.

Referring now to FIG. 5, an article of manufacture or a computer program product 500 of the invention is illustrated. The computer program product 500 includes a computer readable recording medium 502, such as, a floppy disk, a high capacity read only memory in the form of an optically read compact disk or CD-ROM, a tape, or another similar computer program product. Computer readable recording medium 502 stores program means or control code 504, 506, 508, 510 on the medium 502 for carrying out the methods for data confidentiality and integrity of stored data of the embodiments of the invention in the system 100 of FIG. 1.

A sequence of program instructions or a logical assembly of one or more interrelated modules defined by the recorded program means or control code 504, 506, 508, 510, direct the system 100 for implementing data confidentiality and integrity of stored data of the embodiments of the invention.

While the present invention has been described with reference to the details of the embodiments of the invention shown in the drawing, these details are not intended to limit the scope of the invention as claimed in the appended claims.

What is claimed is:

1. A method for implementing data confidentiality and integrity of stored data written in overlapping data tracks on a recordable surface of a storage device comprising:
    storing a unique write counter for each zone being written to the recordable surface of the storage device;
    using an encryption key to encrypt each data sector being written and to decrypt each data sector being read, and using said counter information and a logical block address for said data sector for data encryption and decryption.

2. The method as recited in claim 1 wherein storing said unique write counter for each zone being written includes storing said unique write counter at a beginning of each zone being written.

3. The method as recited in claim 1 wherein storing said unique write counter for each zone being written includes storing said unique write counter in a cache memory.

4. The method as recited in claim 1 wherein storing said unique write counter for each zone being written includes storing said unique write counter at a disk-maintenance area of the recordable surface of the storage device.

5. The method as recited in claim 1 wherein using said counter information and a logical block address for said data sector for data encryption and decryption includes concatenating said counter information and said logical block address for said data sector.

6. The method as recited in claim 1 includes writing to a zone, storing a message authentication code for said zone; and using said message authentication code to perform data integrity checking on a sector of said zone, when said zone is being read.

7. The method as recited in claim 6 includes accessing a cache memory to identify zone counter information for a sector and providing a key for decryption of sector data using said zone counter information.

8. The method as recited in claim 7 includes reading said sector from a zone and providing sector data to a host.

9. The method as recited in claim 8 includes identifying said message authentication code for said zone, reading all sectors of said zone and using said message authentication code to perform data integrity checking for said sector.

10. An apparatus for implementing data confidentiality and integrity of stored data written in overlapping data tracks on a recordable surface of a storage device comprising:
    the recordable surface of the storage device including a plurality of zones, each zone including separate overlapping data tracks;
    a controller storing a unique write counter information for each zone being written to the recordable surface of the storage device; and
    said controller using an encryption key for encrypting each data sector within each zone being written, and using said counter information and a logical block address for said data sector encryption; said data sector being decrypted by using said counter information, said logical block address and said encryption key.

11. The apparatus as recited in claim 10, includes control code stored on a computer readable medium, and wherein said controller uses said control code for implementing data confidentiality and integrity of stored data.

12. The apparatus as recited in claim 10, wherein said controller stores said unique write counter information at a beginning of each zone being written.

13. The apparatus as recited in claim 10, wherein said controller stores said unique write counter information in a cache memory for each zone being written.

14. The apparatus as recited in claim 10, wherein said controller stores said unique write counter information at a disk-maintenance area of the recordable surface of the storage device.

15. The apparatus as recited in claim 10, wherein said controller stores a message authentication code for each said zone being written.

16. The apparatus as recited in claim 15, wherein said controller reads a data sector from said zone, and sends said read sector data to a host.

17. The apparatus as recited in claim 16, wherein said controller uses said message authentication code to perform data integrity checking on a data sector read from said zone.

18. A data storage device comprising:
 at least one disk; said disk including a recordable surface; said recordable surface including a plurality of zones; each said zone including a plurality of overlapping data tracks;
 a controller storing a unique write counter information for each zone being written to said recordable surface; and
 said controller using an encryption key for encrypting and decrypting each data sector within each zone being written, together with said counter information and a logical block address for said data sector.

19. The data storage device as recited in claim 18, wherein said controller stores said unique write counter information in a cache memory, and accesses said cache memory to identify said zone counter information for a data sector being read.

20. The data storage device as recited in claim 18, wherein said controller stores a message authentication code for each said zone being written; and said controller uses said message authentication code to perform data integrity checking on a data sector read from said zone, when said zone is being read.

* * * * *